United States Patent Office 3,023,632
Patented Mar. 6, 1962

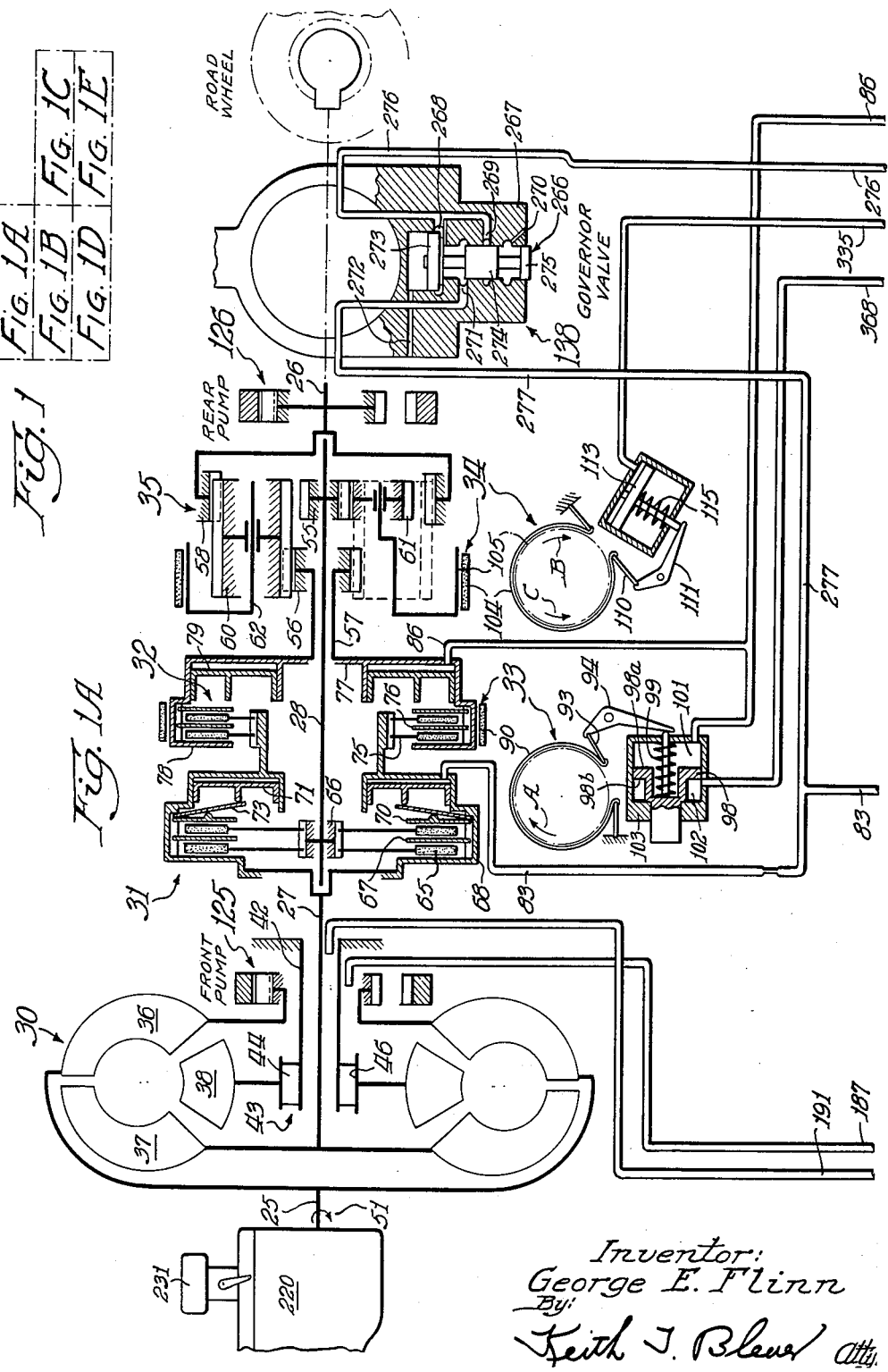

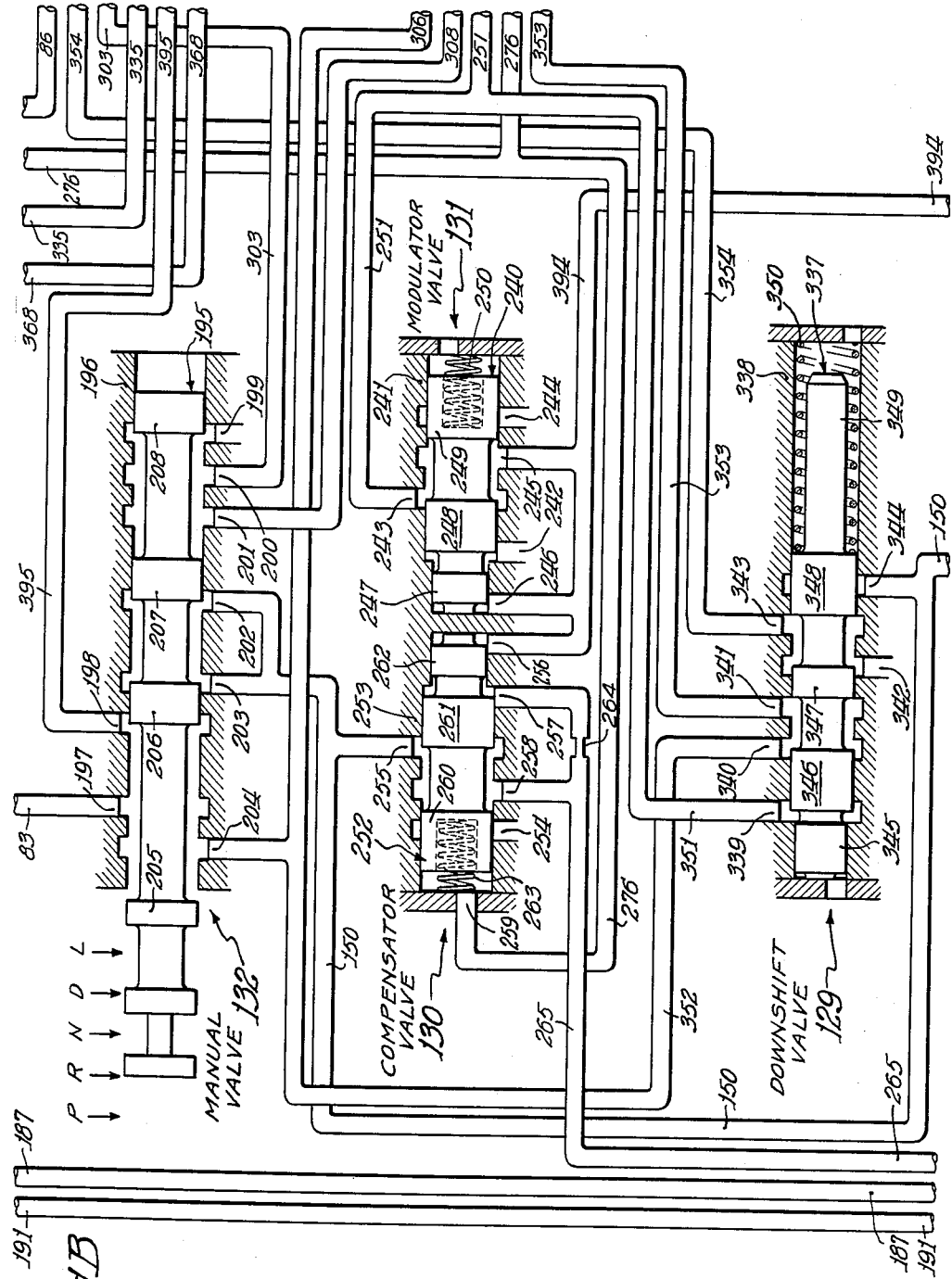

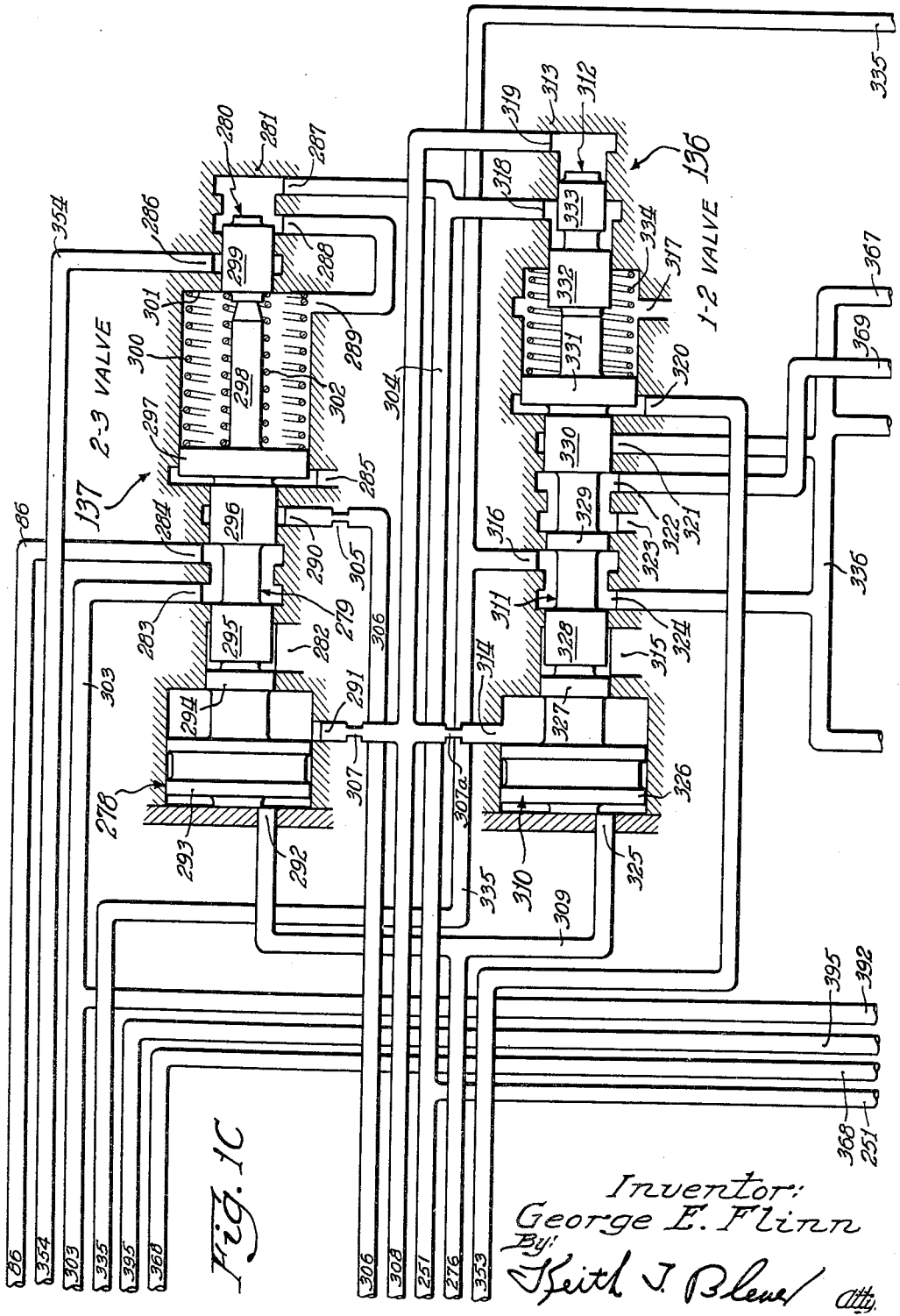

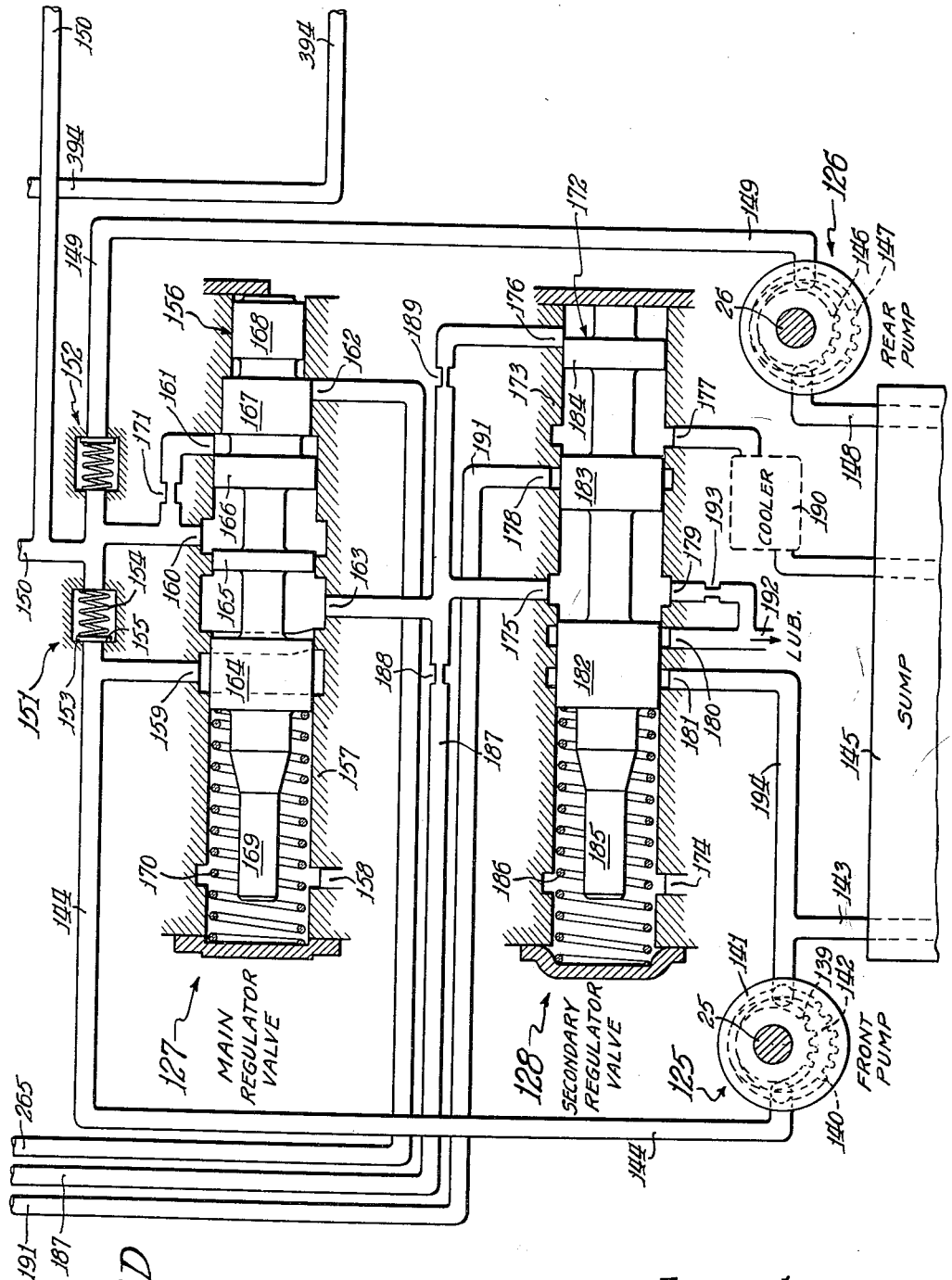

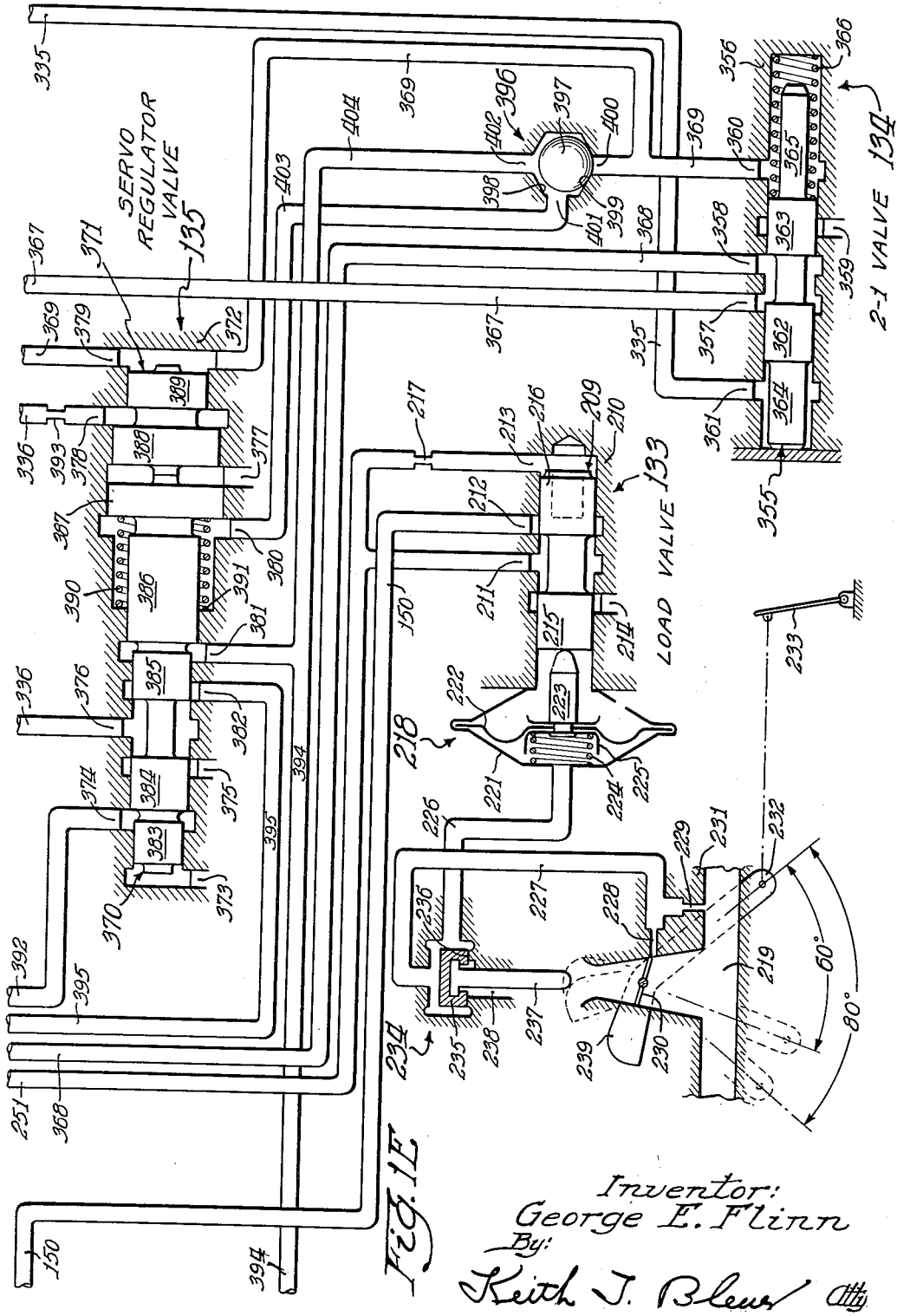

3,023,632
CONTROL FOR TRANSMISSION
George E. Flinn, Muncie, Ind., assignor to Borg-Warner Corporation, Chicago, Ill., a corporation of Illinois
Filed Oct. 24, 1955, Ser. No. 542,142
9 Claims. (Cl. 74—472)

My invention relates to transmissions for automotive vehicles and more particularly to hydraulic control systems for such automotive transmissions.

It is an object of my invention to provide an improved hydraulic control system for an automotive transmission of the type that has a plurality of different speed ratio drives in the forward direction and a reverse drive.

It is an object to provide improved mechanism for downshifting the transmission, that is, changing it from a higher to a lower speed ratio drive, under the control of the vehicle accelerator, which more particularly comprises a valve under the control of the accelerator is opened when the accelerator reaches an open throttle kickdown position for supplying an increased fluid pressure effective on a downshift valve for moving the latter valve from an upshifted to a downshifted position for causing such downshifting.

It is another object of the invention to provide such an improved control system which comprises a selector having a drive range and a low range position, with the control system being such that, when the selector is set in drive range position, it causes the transmission to start the vehicle in an intermediate speed ratio but may cause downshifting immediately when the accelerator is moved to an open throttle kickdown position, for giving increased torque for starting the vehicle.

It is also an object to so arrange the transmission controls that, when the selector is set in its low range position, the transmission, upon reaching low speed ratio, remains in this speed ratio regardless of subsequent increases in vehicle speed.

It is contemplated that the transmission shall preferably comprise a fluid pressure engaged brake for completing each of two lower speed ratios, that is, a low speed ratio and an intermediate speed ratio, and it is contemplated that one of the brakes, namely that for the low speed ratio, shall be engageable to complete also the reverse drive through the transmission. It is an object to provide improved fluid pressure regulating valving for supplying different regulated pressures to the brakes for each of the three drives, each of the pressures being responsive to the positioning of the vehicle accelerator and increasing with engine throttle opening.

The invention consists of the novel constructions, arrangements and devices to be hereinafter described and claimed for carrying out the above stated objects and such other objects as will be apparent from the following description of a preferred embodiment of the invention illustrated with reference to the accompanying drawings, wherein:

FIG. 1 is a diagram showing the manner in which FIGS. 1A, 1B, 1C, 1D and 1E may be positioned with respect to each other; and FIGS. 1A, 1B, 1C, 1D and 1E are portions of a transmission control system which shall be placed together in the manner illustrated in FIG. 1 in order to form a complete showing of a control system embodying the principles of the invention.

Like characters of reference designate like parts in the several views.

My invention of control for transmission constitutes an improvement in the transmission control systems disclosed in the copending applications of Robert W. Wayman, S.N. 166,136, filed June 5, 1950, for "Control for Power Transmission"; of Robert W. Wayman, S.N. 249,-296, filed October 2, 1951, now Patent No. 2,770,148 issued November 13, 1960, for "Transmission"; and of William V. Harrison and George E. Flinn, S.N. 462,300, filed October 14, 1954, now Pataent No. 2,938,403 issued May 31, 1960, for "Control for Transmission."

The transmission may be seen to comprise a drive shaft 25, a driven shaft 26, and intermediate shafts 27 and 28. The shaft 25 may be the usual crankshaft of the vehicle engine, and the shaft 26 may be connected by any suitable means (not shown) with the driving road wheels of the vehicle. The shafts 27 and 28 are in effect piloted with respect to the shafts 25 and 26. The transmission comprises in general, a hydraulic torque converter 30, hydraulically operated friction clutches 31 and 32, hydraulically operated friction brakes 33 and 34 and a planetary gear set 35.

The hydraulic torque converter 30 comprises a vaned impeller element 36, a vaned rotor or driven element 37 and a vaned stator or reaction element 38. The impeller 36 is driven from the drive shaft 25, and the rotor 37 is fixed to the intermediate shaft 27. The stator 38 is rotatably disposed on a stationary sleeve 42, and a one-way brake 43 as disposed between the stator and the sleeve 42. The one-way brake 43 may be of any suitable construction, and, in the illustrated embodiment, comprises a plurality of tiltable sprags 44 disposed between the sleeve 42 and an outer race 46 fixed with respect to the stator 38. The one-way brake 43 is so arranged as to allow a free rotation of the stator 38 in the forward direction, that is, in the same direction in which the drive shaft 25 rotates and which is indicated by the arrow 51 and prevents a rotation of the stator in the reverse direction.

The torque converter 30 functions in a manner well known for such torque converters for driving the rotor or driven element 37 at an increased torque with respect to the torque impressed on the impeller 36 of the converter. The vanes of the stator 38 function to change the direction of flow of fluid between the rotor and impeller so as to provide this increased torque on the driven element 37. In this case, the reaction on the stator 38 is in the direction reverse to the rotation of the drive shaft 25, so that the one-way brake 43 engages and prevents rotation of the stator in this direction. When the speed of the driven element or rotor 37 reaches a predetermined value, the reaction on the vanes of the stator 38 changes in direction, tending to rotate the stator in the forward direction, and the brake 43 releases and allows such rotation of the stator. In this case, the torque converter 30 functions as a simple fluid coupling to drive the rotor 37 at substantially the same speed and with no increase in torque with respect to the impeller 36.

The planetary gear set 35 comprises a sun gear 55 which is fixed on the shaft 28, a second sun gear 56 fixed on a sleeve portion 57 which is rotatable on the shaft 28, a ring gear 58 fixed with respect to the driven shaft 26, a plurality of planet gears 60, a plurality of planet gears 61 and a planet gear carrier 62. Each planet gear 60 and each of the planet gears 61 is rotatably disposed in the carrier 62. The gear carrier 62 is rotatably disposed with respect to the shaft 28 and shaft portion 57 by any suitable bearings. The planet gears 61 are each in mesh with the sun gear 55 and also with a planet gear 60. The gears 60 are also in mesh with the ring gear 58, and the gears 60 are in mesh with the sun gear 56.

The clutch 31 is arranged to connect the shaft 27 driven by the rotor 37 with the shaft 28 and the sun gear 55 formed thereon. The clutch 31 comprises clutch discs 65 splined on to a hub member 66 which is fixed on the shaft 28. The clutch also comprises clutch discs 67 interleaved between the discs 65 and fixed within a part or member 68 rotatably disposed on the shaft 28 and fixed to the shaft 27 so as to be driven by the latter shaft.

The clutch 31 comprises a fixed pressure plate portion 69 of the member 68, a movable pressure plate 70 splined within the member 68 and adapted to press the friction discs 65 and 67 together in frictional engagement between it and the portion 69 which acts as a pressure member on the other side of the discs. An annular piston 71 is provided for actuating the movable pressure plate 70. Pressure from the piston 71 is transmitted to the pressure plate 70 through a spring strut 73. The strut 73 at its inner periphery is acted on by the piston 71, so that its inner periphery moves axially with respect to its outer periphery and moves the pressure plate 70 which is acted on by the strut 73 at intermediate points thereof. The resilient action of the spring 73 functions to return the piston 71 back into its illustrated position when fluid pressure, applied as will be hereinafter described, is released from the piston.

The clutch 32 is arranged to connect the part 68 and thereby the shaft 27 with the shaft portion 57 and sun gear 56 and comprises clutch discs 75 splined on to the member 68 and clutch discs 76 splined within a part or member 77 which is fixed to the shaft portion 57. A pressure plate portion 78 is fixed to the member 77 on one side of the clutch discs, and an annular hydraulic piston 79 is provided on the other side of the discs for compressing the discs between it and the pressure plate portion 78.

Fluid under pressure is supplied to the piston 71 by a passage 83. A passage 86 is provided for supplying fluid under pressure to the piston 79. The passages 83 and 86, which are stationary, are connected with the rotatable parts 68 and 77 by any suitable manifold means (not shown).

The brake 33 comprises a brake band 90 adapted to be contracted on the part 77 for thereby braking the sun gear 56. One end of the band 90 is fixed, and the other end is adapted to have force applied to it for tightening the band on the part 77 by means of a strut 93 disposed between this end of the band and one end of a lever 94. The lever 94 is acted on at its opposite end by a piston 98. A spring 99 is provided for yieldably holding the piston 98 in its brake disengaging position. Fluid pressure chambers 101 and 102 are provided on opposite sides of the piston 98 within a servo motor 103 containing the piston 98.

The brake 34 comprises a brake band 104 adapted to be contracted on a drum portion 105 of the planetary gear carrier 62. The band 104 has one of its ends fixed, and the band 104 at its other end is acted on by a strut 110 which is disposed between this end of the band and a lever 111 which is acted on by a piston 113. A spring 115 is provided for yieldably holding the piston 113 in its brake disengaging position.

In operation, the transmission has a neutral condition and provides low, intermediate and high speed ratios in forward drive and a drive in reverse. The transmission is in neutral condition when the clutches 31 and 32 and the brakes 33 and 34 are disengaged. For ordinary driving conditions of the vehicle, the transmission is operated in its high range which includes for most conditions of operation the intermediate and high speed ratios.

The intermediate speed ratio power train is completed by engaging the clutch 31 and the brake 33. The clutch 31 is engaged by applying fluid pressure to the piston 71 through the conduit 83. Engagement of the brake 33 may be obtained by applying fluid pressure to the piston surface 98b to move the piston 98 to the right and rotate the lever 94 counterclockwise and thereby tighten the band 90 on the part 77. The intermediate speed power train exists from the drive shaft 25 through the torque converter 30 to the intermediate shaft 27 and thence through the clutch 31 to the shaft 28 and through the planetary gear set 35 to the driven shaft 26. The brake 33 is effective to hold the part 77 stationary and to brake the sun gear 56 of the planetary gear set, so that the sun gear 56 constitutes the reaction element of the gear set. The shaft 28 is driven as just described, and the sun gear 55 of the gear set 35 thus constitutes the driving element of the gear set. The drive is transmitted through the planet gears 61 and 60 to the ring gear 58 driving the driven shaft 26. Since there are sets of two planet gears 61 and 60 between the sun gear 55 and the ring gear 58, and the sun gear 56 in mesh with the gears 60 functions as the reaction element of the gear set, the ring gear 58 and thereby the shaft 26 are driven at a reduced speed, intermediate speed ratio, with respect to the shaft 27. At this point, it may be noted that the direction of reaction on the sun gear 56 and the part 77 is in the reverse direction as indicated by the arrow A. This direction is opposite the direction of rotation of the drive shaft 25 indicated by the arrow 51, and the part 77 in tending to rotate in this direction augments the action of the strut 93 in engaging the band 90 and causes increased band engagement, since the part 77 tends to carry the end of the band acted on by the strut 93 along with the part 77 in the same direction in which this end of the band is urged by the strut. It is apparent that the band 90 wraps or is partially self-energizing for this rotative tendency of the part 77.

The high speed ratio power train through the transmission, which constitutes a substantially direct drive between the shafts 25 and 26, may be obtained by engaging the clutch 32, allowing the clutch 31 to remain engaged. The clutch 32 may be engaged by applying fluid pressure through the passage 86 to the piston 79. The brake 33 is disengaged at this time as by applying a fluid pressure to the piston face 98a overcoming the fluid pressure on the opposite face 98b. In this drive, the shaft 27 is driven through the torque converter 30 from the drive shaft 25 as in intermediate speed drive. The shaft 27 is connected through the clutch 31 to drive the sun gear 55 as was the case in intermediate speed drive. The clutch 32 functions to connect the part 68, which in turn is connected with the shaft 27, with the part 77 and thereby with the sun gear 56 fixed thereto. Thus both the sun gear 55 and also the sun gear 56 are driven by the shaft 27, and as is well known in connection with planetary gear sets, when two elements of the gear set are driven at the same speed, the gear set becomes locked up so that all of its gears and elements rotate as a unit, and there is thus a direct drive between the shaft 27 and driven shaft 26. A substantially direct drive generally exists in this power train between the shafts 25 and 26, since the converter 30 may be expected to function substantially as a simple fluid coupling in this drive.

The low speed forward drive may be obtained by engaging the clutch 31 and the brake 34. The clutch 31 is engaged as has been previously described, and the brake 34 may be engaged by applying fluid pressure on the piston 113 causing a movement of the piston 113 against the action of the spring 115 and a rotation of the lever 111 in the clockwise direction so as to pull the band 104 about the drum portion 105. Engagement of the brake 34 causes the planet gear carrier 62 to function as the reaction element of the gear set, and the sun gear 55 is driven from the shafts 25 and 27 substantially as in intermediate speed drive. Since there are sets of the two planet gears 61 and 60 between the sun gear 55 and ring gear 58, the ring gear 58 is driven in the forward direction at a reduced speed drive with respect to the sun gear 55 and shaft 28, and the speed of the ring gear 58 and shaft 26 connected therewith is lower than their speed relative to the shaft 28 for intermediate speed drive. For most vehicle driving conditions when low speed drive is used, the rotor 37 is driven at increased torque, and the gear set 35 connected in tandem with the converter 30 also increases the torque to provide a relatively great overall torque ratio between the shafts 25 and 26. It may be noted that the reaction on the planet gear carrier 62 and on the drum 105 for low speed forward drive is in the reverse direction indicated by the arrow B which is opposite to the direction of rotation of the drive shaft 25, and this reaction or tendency to rotate tends to move the band to unwrap and disengage the band from the drum 105. For this direction of reaction, the brake 34 is thus self-deenergizing and provides a less braking effect than for a case in which this reaction did not exist.

Reverse drive may be obtained through the transmission by engaging the brake 34 and engaging the clutch 32. For this drive, the power train exists from the drive shaft 25 through the torque converter 30 to the intermediate shaft 27 and from thence through the clutch 32 to the sun gear 56 and through the planetary gear set 35 to the driven shaft 26. The brake 34 causes the planet gear carrier 62 to function as the reaction element of the gear set, and since there are only the single planet gears 60 between the sun gear 56 and the ring gear 58, the ring gear 58 will be driven at a reduced speed in the reverse direction with respect to the sun gear 56 and the shaft 27 in accordance with well known principles of operation of planetary gear sets. For this drive, the torque converter 30 functions generally to increase torque, and thus the torque impressed on the driven shaft 26 is the product of the torque increases by the torque converter 30 and the planetary gear set 35. The reaction on the brake drum 105 for reverse drive is in the forward direction as indicated by the arrow C, that is, in the same direction as the drive shaft 25 rotates. This tendency of the drum 105 to rotate in this direction assists the strut 110 in forcing the associated band end to move in the direction indicated by the arrow C, and the brake 34 thus wraps or is self-energizing for this direction of reaction so that the braking effect is greater than would be the case if there were no tendency for the drum to rotate. The reaction on the drum 105 is greater for reverse drive than for low forward drive, and hence the brake 34 has been constructed to wrap for the reaction for reverse drive instead of that for low speed forward drive.

The hydraulic control system for the transmission comprises in general a front pump 125, a rear pump 126, a main regulator valve 127, a secondary regulator valve 128, a downshift valve 129, a compensator valve 130, a modulator valve 131, a manual selector valve 132, a load valve 133, a 2–1 valve 134, a servo regulator valve 135, a 1–2 valve 136, a 2–3 valve 137, and a hydraulic governor 138.

The pump 125 may be of any suitable construction, and in the illustrated embodiment, comprises an inner gear 139 in mesh with an eccentrically disposed outer gear 140. The inner gear is connected to be driven by the shaft 25 through the impeller 36 of the converter 30. The gears 139 and 140 are disposed in a pump casing 141, and the casing 141 comprises a crescent shaped portion 142 disposed between the gears 139 and 140, as shown. The inner gear 139 is driven from the shaft 25 so that the gears 139 and 140 rotate together and carry fluid across the inner and outer faces of the crescent shaped casing portion 142, pumping from an inlet conduit 143 to an outlet conduit 144. The conduit 143 is arranged to draw fluid out of a transmission sump 145. The fluid used is preferably oil suitable for lubrication purposes.

The rear pump 126 is similar in construction to the front pump 125 and comprises an inner gear 146 in mesh with an eccentrically disposed ring gear 147. The gear 146 is fixed on the driven shaft 26 of the transmission by any suitable means. The pump 126 functions to pump fluid from an inlet conduit 148 and discharge it into an outlet conduit 149. The inlet conduit 148, like the conduit 143, is arranged to draw fluid from the transmission sump 145.

The pumps 125 and 126 are adapted to discharge fluid into a line pressure supply conduit 150 through check valves 151 and 152, respectively. Each of the check valves comprises a piston 153 held by the pressure of a spring 154 on a seat 155. The conduits 144 and 149 are respectively connected with the line pressure supply conduit 150 through the check valves 151 and 152, and the check valves function respectively to prevent fluid flow back into the conduits 144 and 149, respectively, when the pistons 153 rest on the seats 155 due to the action of the springs 154.

The main regulator valve 127 regulates line pressure in the line pressure conduit 150 and comprises a piston 156 slidably disposed within a hollow casing portion 157. The casing portion 157 is provided with ports 158, 159, 160, 161, 162 and 163. The piston 156 is provided with lands 164, 165, 166, 167 and 168 and a reduced end portion 169. A spring 170 is disposed about the end portion 169 of the piston 156 and lies between the land 164 and the adjacent end of the cavity in which the piston 156 is disposed.

The port 158 is a bleed port adapted to freely discharge into the sump 145; the port 159 is connected to the conduit 144; the port 160 is connected to the line pressure supply conduit 150; and the port 161 is connected through a restriction 171 with the conduit 150.

The secondary regulator valve 128 regulates the pressure in the torque converter 30 and comprises a piston 172 slidably disposed within a casing portion 173. The casing portion 173 is provided with ports 174, 175, 176, 177, 178, 179, 180 and 181. The piston 172 is provided with lands 182, 183 and 184 and a reduced elongated end portion 185. A spring 186 is disposed about the reduced end portion 185 and between the land 182 and the adjacent end of the cavity in which the piston 172 is disposed. The port 174 is a bleed port; the port 175 is connected to the port 163 of the valve 127 and is also connected through a conduit 187 having a restriction 188 therein with the torque converter 30 for supplying fluid under pressure to the torque converter; the port 176 is connected through a restriction 189 with the conduit 187; the port 177 is connected to a fluid cooler 190 which in turn is adapted to discharge into the sump 145; the port 178 is connected by means of a conduit 191 with the torque converter 30, the conduit 191 constituting a return conduit for fluid from the converter 30; the ports 179 and 180 are connected with a lubrication conduit 192 which supplies fluid to certain parts of the gearing and working parts of the transmission for lubricating purposes, the connection of the port 179 to the conduit 192 being through a restriction 193; and the port 181 is connected with a suction conduit 194 which is in turn connected with the sump 145 for drawing fluid out of the sump. The cooler 190 may be of any suitable construction, such as the well known type having oil circulating coils disposed within a water jacket.

Line pressure as regulated by the valve 127 is supplied to the manual selector valve 132 for distribution to various of the components of the transmission control system. The selector valve 132 comprises a piston 195 slidably disposed within a casing portion 196. The casing portion 196 is provided with ports 197, 198, 199, 200, 201, 202, 203 and 204. The piston 195 is provided with lands 205, 206, 207 and 208. The port 197 is connected with the conduit 83 which is in turn connected with the piston 71 for the front clutch 31; the port 199 is a bleed port; and the ports 202 and 203 are connected with the line pressure supply conduit 150.

The load valve 133 is supplied with line pressure and regulates this pressure to provide one that varies in accordance with the load on the vehicle engine. The load valve 133 comprises a piston 209 slidably disposed in a casing portion 210. The casing portion 210 is provided with ports 211, 212, 213 and 214. The piston 209 is provided with lands 215 and 216. The port 212 is connected to the line pressure supply conduit 150; the ports 213 and 211 are connected together, and a restriction 217 is provided in series with the port 213; and the port 214 is a bleed port.

The piston 209 is under the control of a vacuum motor 218 which in turn is controlled by the vacuum present in the intake manifold 219 of the vehicle engine 220. The vacuum motor 218 comprises a casing 221 having a flexible diaphragm 222 fixed therein at its periphery. A rigid stem 223 is fixed to the diaphragm 222 at the center of the diaphragm, and a spring 224 is disposed between an end of the casing 221 and a spring retainer 225 fixed with respect to the stem 223. The casing 221 is connected to a conduit 226 having manifold vacuum therein at times, for applying this vacuum on the diaphragm 222 so as to move the stem 223 to the left against the action of the spring 224, for purposes which will hereinafter be described.

The conduit 226 is connected by means of a conduit 227 and restrictions 228 and 229 with the engine manifold 219. The restriction 229 is in parallel with the restriction 228, the restriction 229 being directly connected with the manifold 219 and the restriction 228 being located directly below the butterfly valve plate 230 of the engine carburetor 231 when the carburetor plate 230 is in its closed throttle position. The carburetor plate 230 is fixed to the usual throttle lever 232 which is connected by means of conventional linkage with the vehicle accelerator 233.

A valve 234 is provided for at times connecting the conduit 226 directly with atmosphere. The valve 234 comprises a valve piston 235 resting on a seat 236 and adapted to be actuated and raised off the seat by means of a stem 237. The valve 234 comprises a passage 238 connected with atmosphere, and when the piston 235 is raised off its seat 236, it provides a connection between the passage 238 and the conduit 226 for supplying atmospheric pressure to the motor 218. The throttle lever 232 is provided with a cam 239 on its upper end which is adapted to contact the lower end of the stem 237 so as to raise the stem 237 and valve piston 235 when the accelerator is moved to a fully open throttle position.

The modulator valve 131 is under the control of the output pressure from the load valve 133. The modulator valve 131 comprises a piston 240 disposed in a casing portion 241. The casing portion 241 is provided with ports 242, 243, 244, 245 and 246. The piston 240 is provided with lands 247, 248 and 249. A spring 250 is provided between the right end of the piston 240 and the adjacent end of the cavity in the casing portion 241 in which the piston 240 is disposed. The port 242 is a bleed port; the port 243 is connected by means of a conduit 251 with the ports 211 and 213 of the load valve 133, these ports 211 and 213 being the outlet ports of the load valve; and together with the conduit 251 carrying a so-called throttle pressure which varies with the throttle opening and output torque of the vehicle engine due to the regulating action of the load valve 133; the port 244 is a bleed port; and the ports 245 and 246 are connected together, the latter ports being the outlet ports of the modulator valve 131.

The compensator valve 130 is controlled from the modulator valve 131. The compensator valve 130 comprises a piston 252 slidably disposed within a casing portion 253. The casing portion 253 is provided with ports 254, 255, 256, 257, 258 and 259. The piston 252 is provided with lands 260, 261 and 262, and the piston is acted on by a spring 263 disposed between the left end of the piston 252 and the adjacent end of the cavity within the casing portion 253 in which the piston 252 is disposed. The port 254 is a bleed port; the port 255 is connected with the line pressure supply conduit 150; the port 256 is connected with the ports 245 and 246 of the modulator valve 131; the port 257 is connected by means of a restriction 264 and a conduit 265 with the port 162 of the main regulator valve 127; and the port 258 is also connected with the conduit 265.

The compensator valve 130 is also under control of the governor 138. The governor 138 comprises a valve piston 266 slidably disposed in a casing portion 267 which is fixed on the driven shaft 26 of the transmission to rotate therewith. The casing portion 267 is provided with ports 268, 269, 270, 271 and 272. The piston 266 is provided with lands 273, 274 and 275. As will be noted, the piston 266 is radially disposed with respect to the shaft 26 so that it tends under the action of centrifugal force to move radially outwardly with respect to the cavity in the casing portion 267 in which the piston 266 is disposed. The ports 268 and 269 are output ports from the governor 138 and are connected by means of a conduit 276 with the port 259 of the compensator valve 130; the port 270 is a bleed port; the port 271 is the port supplying fluid to the governor 138 and is connected by means of a branch conduit 277 with the conduit 83 and port 197 of the selector valve 132; and the port 272 is a bleed port.

The 2–3 valve 137 is for upshifting the transmission from intermediate speed ratio to high speed ratio and comprises 3 pistons 278, 279 and 280 slidably disposed in a casing portion 281. The casing portion 281 is provided with ports 282, 283, 284, 285, 286, 287, 288, 289, 290, 291 and 292. The piston 278 is provided with lands 293 and 294; the piston 279 is provided with lands 295, 296 and 297 and with a reduced end portion 298; and the piston 280 is a simple plug and is provided with the single land 299. A spring 300 is provided between the land 297 and an adjacent face 301 of the casing portion 281, and a spring 302 is provided between the land 297 and the piston 280.

The port 282 is a bleed port; the port 283 is connected by means of a conduit 303 with the port 200 of the selector valve 132; the port 284 is connected with the conduit 86 and thereby with the clutch 32 and with the piston 98 for the brake 33; the port 285 is a bleed port; the port 287 is connected by means of a branch conduit 304 with the conduit 251 carrying engine torque conscious pressure from the load valve 133; the ports 288 and 289 are connected together; the port 290 is connected through a restriction 305 with a conduit 306 connected to the port 204 of the manual selector valve 132; the port 291 is connected through a restriction 307 to a conduit 308 which in turn is connected to the port 201 of the selector valve 132; and the port 292 is connected by means of a branch conduit 309 with the governor pressure supply conduit 276.

The 1–2 valve 136 is for upshifting the transmission from first to second speed forward drive and is a valve similar to the valve 137. The valve 136 comprises three pistons 310, 311 and 312 slidably disposed in a casing portion 313. The casing portion 313 is provided with ports 314, 315, 316, 317, 318, 319, 320, 321, 322, 323, 324 and 325. The piston 310 is provided with lands 326 and 327; the piston 311 is provided with lands 328, 329, 330 and 331; and the piston 312 is provided with lands 332 and 333. A spring 334 is provided between the land 331 and an opposite internal face of the casing portion 313. The port 314 is connected through a restriction 307a with the conduit 308; the port 315 is a bleed port; the port 316 is connected through a conduit 335 with the piston 113 for the brake 34; the port 317 is a bleed port; the port 318 is connected with the conduit 304; the port 319 is connected with the conduit 308; the ports 321 and 324 are connected together through a conduit 336; the port 323 is a bleed port; and the port 325 is connected with the governor pressure conduit 276.

The downshift valve 129 is provided for causing downshifting movement of the shift valves 136 and 137 at times. The downshift valve 129 comprises a piston 337 disposed within a casing portion 338. The casing portion 338 is provided with ports 339, 340, 341, 342, 343 and 344. The piston 337 is provided with lands 345, 346, 347 and 348 and a reduced elongated end portion 349. A spring 350 is disposed about the elongated end portion 349 and between the land 348 and the adjacent end of the cavity in the casing portion 338 in which the piston 337 is disposed. The port 339 is connected with the conduit 251 by means of a branch conduit 351; the port 340 is connected to the port 204 of the selector valve 132 by means of a conduit 352; the port 341 is connected to the port 320 of the 1–2 valve 136 by means of a conduit 353; the port 342 is a bleed port; the port 343 is connected by means of a conduit 354 with the port 286 of the 2–3 valve 137; and the port 344 is connected to the line pressure supply conduit 150.

The 2–1 valve 134 is effective for providing the proper overlap of engagement of the brakes 33 and 34 for a change from second to first speed ratio. The valve 134 comprises a valve piston 355 disposed in a casing portion 356. The casing portion 356 is provided with ports 357, 358, 359, 360 and 361. The piston 355 is provided with lands 362 and 363 and elongated reduced end portions 364 and 365. A spring 366 is disposed about the end portion 365 and extends between the land 363 and the adjacent end of the cavity in the casing portion 356 in which the piston 355 is disposed. The port 357 is connected by means of a branch conduit 367 with the conduit 336 and thereby with the ports 324 and 321 of the 1–2 valve 136; the port 358 is connected by means of a conduit 368 with the piston 98 of the servo motor for the brake 33; the port 359 is a bleed port; the port 360 is connected by means of a conduit 369 with the port 322 of the 1–2 valve 136; and the port 361 is connected with the conduit 335.

The servo regulator valve 135 functions to properly regulate the engaging fluid pressure for the brakes 33 and 34 for a smooth engagement and comprises valve pistons 370 and 371. The pistons are disposed in a casing portion 372 which is provided with ports 373, 374, 375, 376, 377, 378, 379, 380, 381 and 382. The piston 370 is provided with lands 383, 384, 385, 386 and 387; and the piston 371 is provided with lands 388 and 389. A spring 390 is disposed between the land 387 and a face 391 of the casing portion 372.

The port 373 is a bleed port; the port 374 is connected by means of a branch conduit 392 with the conduit 303; the port 375 is a bleed port; the port 376 is connected with the conduit 336; the port 377 is a bleed port; the port 378 is connected through a restriction 393 with the conduit 336; the port 379 is connected with the conduit 369; the port 381 is connected by means of a conduit 394 with the ports 245, 246 and 256 of the valves 131 and 130; and the port 382 is connected by means of a conduit 395 with the port 198 of the selector valve 132.

A ball chceck valve 396 is provided effectively between certain ports of the valves 135 and 134. The check valve 396 comprises a ball 397 adapted to rest on two different seats 398 and 399. The check valve 396 is provided with ports 400, 401 and 402. The port 400 is connected with the conduit 369; the port 401 is connected by means of a conduit 403 with the port 380 of the servo regulator valve 135; and the port 402 is connected by means of a branch conduit 404 with the port 381 of the valve 135 and with the conduit 394.

In operation, the transmission and its hydraulic control system are under the control of the vehicle operator by means of the accelerator 233 of the vehicle and the manual selector valve 132. The transmission is conditioned for various types of operation by moving the manual selector valve piston 195 into the positions corresponding to the type of operation desired.

The transmission is maintained in its neutral condition by having the manual selector valve piston 195 in its "N" or neutral position. When the engine 220 begins operating, the pump 125 driven by the vehicle engine supplies line pressure to the conduit 150 and connected conduits, pumping oil from the sump 145 through the inlet conduit 143 and into the pump outlet conduit 144 and from thence through the check valve 151 into the line pressure supply conduit 150. The flow of fluid is such as to move the piston 153 of the check valve 151 off its seat 155 against the action of the spring 154 so as to admit fluid under pressure into the line pressure supply conduit 150. Under these conditions, the check valve 152 is held closed by the line pressure in the conduit 150, the piston 153 of the valve 152 being held on its seat 155 due to the line pressure in the conduit 150 and the spring 154 of the valve 152. The line pressure supply conduit 150 is connected to the ports 202 and 203 of the manual selector valve 132; and in the neutral position of the selector valve piston 195, the lands 206 and 207 block admission of this line pressure into any of the other ports of the casing portion 196 for the selector valve 132, thereby preventing application of fluid pressure to the pistons for applying any of the clutches and brakes of the transmission.

The main regulator valve 127 functions for all conditions of the transmission and its hydraulic control system to regulate the line pressure in the line pressure supply conduit 150 and connected conduits to predetermined maximum values. For this purpose, the line pressure is supplied through the restriction 171 and port 161 to the lands 166 and 167. The land 166 is greater in diameter than the land 167, and hence, the line pressure functions to move the piston 156 to the left against the action of the spring 170. Line pressure is also supplied through the port 160 from the line pressure supply conduit 150, and as the piston 156 is moved to the left by the action of the line pressure, the land 165 is moved out of position blocking communication between the ports 160 and 163, and more and more of the pressure from the conduit 150 is vented to the port 163 as the pressure in the supply conduit 150 increases. Conversely, if the pressure in the line pressure supply conduit 150 tends to decrease, the spring 170 will move the piston 156 back toward its original position to the right tending to close the port 163 with respect to the port 160 by the land 165. The land 165 thus meters fluid flow between it and an edge of the port 163 and regulates the pressure in the line pressure supply conduit 150 to a predetermined value which is substantially fixed, assuming that there are no other influences on the piston 156 than just mentioned.

For most conditions of operation, however, an additional variable force is applied to the piston 156 tending to move it, and this third force is due to fluid pressure of different values supplied between the lands 167 and 168 through the port 162 and conduit 265. For the neutral condition of the transmission, with the accelerator 233 in its closed throttle position, full line pressure is applied between the lands 167 and 168 through the port 162, the port 162 being connected with the line pressure supply conduit 150 through the port 255 of the compensator valve 130, the groove between the lands 260 and 261 of the compensator valve piston 252, the port 258 and the conduit 265. This line pressure is applied through the restriction 264 and port 257 from the conduit 265 between the lands 261 and 262 of the compensator valve piston 252. Since the land 261 is larger than the land 262, the piston 252 tends to move to the left against the action of the spring 263 due to the action of the line pressure; however, for this condition of operation, the spring 263 is of sufficient strength to hold the piston 252 to the limit of its movement toward the right, and the fluid applied between the lands 261 and 262 has no effect.

The secondary regulator valve 128 is for the purpose of regulating the fluid pressure within the conduit 187 and thereby within the torque converter 30 to which the conduit 187 supplies fluid pressure. The conduit 187 is connected with the outlet port 163 of the main regulator valve 127, and fluid flows from the port 163 through the restriction 188 and the conduit 187 to the converter 30. The pressure in the conduit 187 is supplied through the restriction 189 and port 176 behind the land 184, and as the fluid pressure in the conduit 187 and thereby in the converter 30 tend to increase, it tends to move the piston 172 to the left against the action of the spring 186 to open up the bleed port 180 and meter fluid between the land 182 and an edge of the port 180 to regulate the fluid to a predetermined maximum pressure. The conduit 192 connected with the port 180 is connected to various mechanical parts of the transmission, so that the excessive oil discharged through the port 180 lubricates the transmission. The port 179 is permanently connected with the port 175, and the conduit 192 is connected through the restriction 193 with the port 179, so that whenever fluid pressure is discharged through the port 163 of the main regulator valve 127, some of it will flow through the ports 175 and 179 and restriction 193 to the lubrication conduit 192. As the lubrication conduit 192 fills up, the pressure in the converter 30 and in the conduit 187 tend to increase still further, and the valve piston 172 will move farther to the left against the action of the spring 186 so as to uncover the land 183 with respect to the port 178. The port 178 is also connected with the converter 30, so that fluid flowing through the converter 30 may flow out through the port 178; and when this additional movement of the piston 172 takes place, there is a metering of fluid between an edge of the land 183 and an edge of the port 178 for maintaining the pressure in the converter 30 at approximately the same value. The fluid discharged through the port 178 flows between the lands 183 and 184 and into the port 177 from which it flows through the cooler 190 into the sump 145. A still further movement of the piston 172 which may occur when the oil is cold and viscous will connect the ports 175, 180 and 181 by means of the groove between the lands 182 and 183, so that the fluid from the port 175 may flow directly to the sump 145 through the conduit 194 and the port 181, the metering in this case being between the land 182 and an edge of the port 181.

The transmission and its control system are conditioned for operation in drive range by moving the manual selector valve piston 195 into its "D" or drive range position in which position the piston 195 connects the ports 203, 198, 197 and 204 together by means of the groove between the lands 205 and 206. Line pressure is supplied through the ports 203 and 197 to the conduit 83 connected with the front clutch apply piston 71, and line pressure applied to the piston 71 causes the application of the front clutch 31. The accelerator is assumed to be in its closed throttle position, and the clutch 31 is thus engaged with a minimum engaging pressure corresponding to the minimum line pressure that exists with this positioning of the accelerator.

The brake 33 is also applied, in addition to the clutch 31, when the selector valve 132 is moved from its "N" to its "D" position. In this position of the selector valve piston 195, the groove between the lands 205 and 206 connects the port 198 and the conduit 395 with the line pressure supply port 203; and fluid pressure flows through the servo regulator valve 135, from the port 382, connected with the conduit 395, through the groove between the lands 384 and 385, the port 376, the conduit 336, the conduit 367 connected with the conduit 336, the port 357 of the 2-1 valve 134, the groove between the lands 362 and 363 of this valve, the port 358 and the conduit 368 to the brake apply cavity 102 of the servo motor for the brake 33.

The pressure in the conduit 336 is regulated by the servo regulator valve 135, and the pressure in the conduit 336 is applied to three different lands of the servo regulator valve 135 for this purpose, tending to move the pistons 370 and 371 in one direction or the other. The conduit 336 is connected through the restriction 393 and port 378 to the land 388, and the servo regulated pressure acts against the land 388 and tends to move the pistons 370 and 371 to the left. In the second speed condition of the transmission, the 1-2 valve 136 is in its upshifted position, with the piston 311 connecting the ports 321 and 322 by means of the groove between the lands 329 and 330; and servo regulated pressure from the conduit 336 thus flows through the port 321, the groove between the lands 329 and 330, the port 322, the conduit 369, and the port 379 to the right end of the piston 371 so as to tend to augment the servo regulated pressure applied through the port 378 tending to move the piston 371 to the left. The servo regulated pressure in the conduit 369 is supplied through the port 400 on the bottom of the ball 397 and moves the ball on to its seat 398 so that the ball closes the port 402 and at the same time provides communication between the ports 400 and 401. The servo regulated pressure in the conduit 369 thus flows through the ports 400 and 401, the conduit 403 and the port 380, so that this pressure is applied to the land 387, augmenting the action of the spring 390 tending to move the pistons 370 and 371 to the right. A modulated throttle pressure is present in the conduit 394 from the modulator valve 131, as will be hereinafter described, this modulated throttle pressure increasing with accelerator opening and engine power output up to a certain limited fluid pressure value, and this modulated throttle pressure is applied through the port 381 on to the land 386 tending to move the pistons 370 and 371 to the right, further opening the port 382 with respect to the port 376 by moving the land 385 off the port 382 as the engine power output and accelerator opening are increased. This force due to the modulated throttle pressure augments the action of the spring 390, and the servo regulated pressure applied through the port 380 tending to move the pistons 370 and 371 to the right in a valve opening direction. The servo regulated pressure applied through the ports 378 and 379 counteract this force tending to move the pistons 370 and 371 to the right; and, as the servo regulated pressure builds up, these pistons are moved to the left due to the servo regulated fluid pressure applied through the ports 378 and 379 closing the port 382 by means of the land 385. The net effect, thus, of the servo regulator valve 135, is to meter fluid flow between edges of the port 382 and of the land 385 to the port 376 and conduit 336, the pressure in the conduit 336 increasing with modulated throttle pressure in the conduit 394, with throttle pressure in the conduit 150, and thereby with increased engine power output and accelerator opening. With decreasing modulated throttle pressure in the conduit 394, the pistons 370 and 371 will move farther to the left to meter between edges of the bleed port 375 and land 384 to cause a corresponding decrease in servo regulated pressure in the conduit 336. This servo regulated pressure, increasing with engine power output, is applied for engaging the brake 33 in this case and is applied for engaging the brake 34 for low and reverse drive, as will be hereinafter described, in order to obtain smooth engagement of the brakes and consequent smooth completions of the power trains.

The 1-2 valve 136 is held in its upshifted position with the groove between the lands 329 and 330 connecting the ports 321 and 322 for this condition of drive, namely, initially when the selector valve piston 195 is put in its "D" position, by the application of line pressure through the port 320 on to the land 331 holding the piston 311 in this position against the action of the spring 334. The line pressure flows from the port 204 of the selector valve 132, through the conduit 352, the port 340 of the downshift valve 129, the groove between the lands 346 and 347, the port 341, and the conduit 353 to the port 320. Servo regulated fluid pressure is thus supplied to the conduit 369 as just described so as to be thereby applied through the ports 379 and 380 to the servo regulator valve 135 for the second speed drive. The 1-2 valve, when in its downshifted position, as will be hereinafter described, will cause application of the brake 34 for low speed drive; however, in its upshifted position in which it is under the present conditions, the brake piston 113 is drained to the sump 145 through the conduit 335, the port 316, the groove between the lands 328 and 329 and the bleed port 323. Any pressure in the conduit 335 will tend to move the 2–1 valve piston 335 to the right; however, since the conduit 335 is drained under the present conditions, the spring 366 and the servo regulated pressure in the conduit 369 will hold the 2–1 valve piston 355 to the limit of its movement to the left, providing communication through the 2–1 valve 134 between the conduits 367 and 368 for supplying brake apply pressure to the cavity 102 for the brake 33.

As the engine throttle is opened, the vehicle will start from rest in its intermediate speed ratio which has been completed as just described by engagement of the clutch 31 and the brake 33. The load valve 133 is responsive to the output torque of the vehicle engine and is thus responsive to the degree of opening of the engine throttle, producing an increasing so-called throttle pressure in the conduit 251 as the vehicle engine output torque and throttle opening increase. The vacuum motor 218 is connected through the conduit 226 and conduit 227 with the restricted passages 229 and 228, and a vacuum varying approximately as the vacuum in the intake manifold 219 is thus applied to the vacuum motor 218, and particularly to its diaphragm 222. The use of the restricted port 228 located in the vicinity of the butterfly valve 230 connected in parallel with the restricted opening 229 leading directly into the engine manifold has been found to produce an output pressure in the conduit 251 which varies very closely with the throttle opening of the vehicle engine as is described in the application of William V. Harrison and George E. Flinn, S.N. 462,300, hereinabove, referred to. The spring 224 in the vacuum motor 218 functions to move the piston 209 to the right through the stud 223, and the piston 209 thus connects the ports 211 and 212 by means of the groove between the lands 215 and 216. The conduit 150 which is provided with line pressure, is connected to the port 212, and fluid under pressure is thus supplied between the lands 215 and 216 to the port 211 and the throttle pressure conduit 251. The pressure in the conduit 251 is applied through the restriction 217 and port 213 on the right end of the piston 209, and as the pressure in the conduit 251 increases, it moves the piston 209 back against the action of the spring 224 to close the port 212 by means of the land 216. A decreasing vacuum in the conduit 226 connected to the intake manifold 219 allows the spring 224 to be increasingly effective to open the port 212 with respect to the port 211 while an increasing vacuum in the conduit 226 will conversely counteract more of the force of the spring 224 tending to move the valve piston 209 to the left. Under the latter conditions, the land 215 will uncover the bleed port 214 and allow some of the fluid in the conduit 251 to drain through the bleed port, thereby reducing the fluid pressure in the conduit 251. The vacuum in the intake manifold 219 increases as the accelerator is relaxed and decreases as it is moved toward its open throttle position, and this changing vacuum impressed on the diaphragm 222 of the motor 218 causes the valve piston 209 to meter fluid between the land 216 and an edge of the port 212 for decreasing values of vacuum and to meter between the land 215 and an edge of the port 214 for increasing values of vacuum and thereby regulate so as to provide a throttle pressure in the conduit 251 that increases and decreases as the output torque and throttle opening of the vehicle engine increase and decrease respectively.

The valve 234 functions to increase the pressure in the throttle pressure conduit 251 to a value higher than it can reach simply under the control of the vacuum in the manifold 219 impressed through the restricted ports 228 and 229 and conduits 227 and 226 on the vacuum motor 218. When the accelerator 233 is moved to its fully opened throttle position, the cam 239 contacts the stud 237 and moves the valve piston 235 off its seat 236. The conduit 226 is thus vented to atmosphere through the passage 238. Inasmuch as the vacuum in the conduit 227 never reaches atmospheric value, regardless of throttle position, the vacuum motor 218 is thus effective to increase the pressure in the throttle pressure conduit 251 above that which is present prior to moving the accelerator to full open throttle position. The pressure in the conduit 251 prior to opening the valve 234 may, for example, be 75 p.s.i.; and, when the valve 234 is opened, this pressure may be increased, for example, to 80 p.s.i.

The throttle pressure in conduit 251 flows into the port 243 of the modulator valve 131 and from thence between the lands 248 and 249 into the port 245 and conduit 394. The modulator valve 131 functions simply as a limiter, limiting the value of modulated throttle pressure in the conduit 394 to 45 p.s.i., for example, while the throttle pressure in the conduit 251 may increase to 80 p.s.i. The modulated throttle pressure in conduit 394 is applied through the port 246 to the left end of the valve piston 240, and when the modulated throttle pressure in conduit 394 reaches the predetermined limit, the pressure on the left end of the piston 240 applied through the port 246 moves the piston 240 to the right against the action of the spring 250 and closes the port 243 by means of the land 248, thereby preventing any further flow of throttle pressure from the conduit 251 to the modulated pressure conduit 394.

The governor valve 138 is a regulator valve similar in principle to the load valve 133. The governor valve 138 is under the influence of the centrifugal force on the valve and regulates an output pressure into a governor conduit 276 that increases coordinately with the speed of the driven shaft 26 of the transmission. The conduit 83 which is supplied with line pressure in the "D" position of the selector valve piston 195 is connected through the conduit 277 with the governor 138. As the speed of the driven shaft of the transmission increases, the governor piston 266 moves outwardly in its bore and thereby uncovers the port 271 connected with the conduit 277 and thereby connects the ports 271 and 268 by means of the groove between the lands 273 and 274 so as to supply fluid pressure into the governor conduit 276. The pressure in the conduit 276 is applied to the large diameter land 273 and tends to move the valve piston 266 back against the action of the centrifugal force and again close the port 271 by means of the land 274. The centrifugal force on the piston 266 exactly balances the force tending to move the piston 266 inwardly of its bore due to the pressure in the conduit 276, and the land 274 meters fluid between an edge of the port 271 and the land so as to maintain a pressure within the governor output conduit 276 which exactly corresponds with the speed of the driven shaft of the transmission. When the speed of the driven shaft of the transmission decreases, the pressure in the conduit 276 will be too high to correspond with the decreased shaft speed; and this fluid pressure will move the piston 266 inwardly, so as to move the land 274 off the port 269 and drain some of the fluid from the conduit 276 between the lands 274 and 275 and through the passage 270 to the sump 145, so that the governor pressure in the conduit 276 will again correspond with the speed of the shaft 26.

Both the modulated throttle pressure and the governor pressure are supplied to the compensator valve 130, so that the compensator valve produces a compensator pressure in the conduit 265 which decreases with increasing modulated throttle pressure and increases with increasing governor speed and increasing speed of the shaft 26. The modulated throttle pressure from the conduit 394 is supplied through the port 256 to the right end of the compensator valve piston 252 and tends to move the piston 252 to the left against the action of the spring 263 to close the supply port 255 by the land 261. Until the piston 252 is so moved, the piston connects the ports 255 and 258 by means of the groove between the lands 260 and 261 so as to supply fluid pressure to the conduit 265. The pressure in the output conduit 265 for the compensator valve 130 is applied through the restriction 264 and port 257 between the lands 261 and 262. Since the land 261 is larger than the land 262, this pressure functions to augment the modulated throttle pressure supplied to the port 256 to move the piston 252 to the left against the action of the spring 263 to close the line pressure supply port 255 by the land 261. Governor pressure in the conduit 276 is supplied through the port 259 so as to augment the action of the spring 263, tending to hold the valve piston 252 in a position opening the port 255 supplying line pressure to the output port 258. The modulated pressure supplied through the port 256 and the governor pressure supplied through the port 259 provided two different control forces on the piston 252, the governor pressure tending to maintain the valve 130 open and the modulated throttle pressure tending to close the valve. The pressure present in the conduit 265 thus decreases with increasing modulated throttle pressure and increases with increasing governor pressure and vehicle speed, and the action of the pressure in the conduit 265 supplied through the restriction 264 and port 257 tending to close the valve 130 causes a regulating action by the valve 130 with a metering of fluid pressure between the land 261 and an edge of the port 255, so that for each combination of modulated throttle pressure and governor pressure, a predetermined compensator pressure is attained in the output conduit 265 for the compensator valve 130. Assuming that the governor pressure decreases, for example, so that the corresponding pressure in the compensator conduit 265 would be too great, in this case, the compensator pressure supplied through the port 257 will move the piston 252 to the left to uncover the bleed port 254 and meter fluid between an edge of the port 254 and the land 260 for returning the compensator pressure in the conduit 265 to the correct value.

The compensator pressure in conduit 265 which increases with vehicle speed and decreases with throttle opening is applied to the main regulator valve 127 through the port 162, the compensator pressure being particularly applied on the lands 167 and 168. Since the land 167 is larger than the land 168, the compensator pressure tends to move the piston 156 to the left against the action of the spring 170 to further open the line pressure conduit 150 with respect to the drain port 163 of the main regulator valve 127. Since the compensator pressure in conduit 265 increases with vehicle speed, there is an increasing effect by the compensator pressure to decrease the line pressure in the conduit 150 as the vehicle speed increases. Conversely, since the compensator pressure in the conduit 265 decreases with increasing modulated throttle pressure and engine throttle opening, there is a decreasing effect of the main regulator valve piston 156 to relieve line pressure, so that the line pressure increases with increasing engine throttle opening. The line pressure is supplied to the various power train completing friction clutches and brakes in the transmission, and the line pressure is made to decrease with increasing speeds of the driven shaft 26 and to increase with increased power output of the vehicle engine in order to attain a smooth engagement of these fiction engaging devices. In order to attain smooth engagement, preferably these devices are engaged with a pressure just sufficient to prevent slippage. Therefore, their engaging pressure should preferably increase with increasing engine output since they must carry greater torque with greater output engine torque; and since the transmission includes a hydraulic torque converter, the torque multiplication through which gradually decreases with increasing speeds, the pressure of application required for these friction devices in general decreases with increasing speeds of the driven shaft 26. It is to be noted that line pressure is not applied directly to the brake pistons 98 and 113 for engaging these, but the line pressure is subsequently regulated by the servo regulator valve 135 for this purpose; and since the line pressure decreases with increasing vehicle speed, the output of the servo regulator valve 135 will be limited in the same manner.

The downshift valve 129 is effective for causing a downshift from either intermediate speed ratio to low speed ratio or from high speed ratio to intermediate speed ratio when the accelerator 233 is moved to its open throttle kickdown position. The downshift valve piston 337 is responsive to throttle pressure in conduits 251 and 351 applied through the port 339 between the lands 345 and 346. This throttle pressure tends to move the piston 337 to the right against the action of its spring 350 but is not sufficiently high to move the valve piston until the accelerator operated valve 234 is actually opened to increase the throttle pressure in conduits 251 and 351 to its highest value. Prior to such movement, the downshift valve piston 337 connects the port 340 and conduit 352 carrying line pressure from the selector valve port 204 with the port 341, the conduit 353 and the 1-2 valve 136. Before such movement of the downshift valve piston 337, it also connects the ports 342 and 343 thereby bleeding the conduit 354 which is connected with the 2-3 valve 137. When the throttle pressure in the conduit 251 is increased to its highest value, it moves the downshift valve piston 337 to the right into its downshifted position against the action of its spring 350 so that the groove between the lands 347 and 346 connects the conduit 353 with the bleed port 342. The downshift valve piston 337 in the latter position also connects the port 344 having line pressure supplied thereto from the conduit 150 with the port 343 and conduit 354 connected with the 2-3 valve 137.

A downshift from second speed drive to first speed drive, on starting the vehicle from rest, may be obtained by moving the accelerator 233 immediately into its downshift position in which it opens the valve 234 to move the downshift valve piston 337 to the right into its kickdown position draining the conduit 353 to the sump 145 through the ports 341 and 342 and the groove between the lands 346 and 347. The spring 334 of the 1-2 valve 136 is then effective to move the pistons 311 and 310 to the limit of their movement to the left so as to block the port 321 supplying fluid under pressure through the valve 136 in second speed drive. The conduit 369 supplied with fluid pressure in second speed drive from the port 322 is drained through the bleed port 323 and the groove between the lands 329 and 330. The piston 311 in its downshifted position connects the ports 324 and 316 through the groove between the lands 328 and 329 so as to apply the servo-regulated pressure within the conduit 336 to the conduit 335 and the piston 113 for the brake 34. The brake 34 is thus engaged to complete the first speed drive through the transmission.

The pressure regulated by the servo regulator valve 135 applied to the first speed brake piston 113 through the conduit 335 is also supplied through this conduit to the port 361 of the 2-1 valve 134 tending to move the piston 355 of the 2-1 valve to the limit of its movement to the right against the action of the spring 366. When the pressure in the conduit 335 and applied on the low speed brake 113 increases sufficiently, the 2-1 valve piston 335 will be moved to the limit of its movement to the right against the spring 366 so as to drain the conduit 368 connected with the brake apply cavity 102 of the second speed brake 33 through the port 358, the groove between the lands 362 and 363 and the port 359, thereby disapplying the brake 33. Until such movement of the piston 355, the servo-regulated pressure in the conduits 336 and 367 remains applied to the apply side 98b of the brake piston 98 through the ports 357 and 358, maintaining the brake 33 engaged. Thus the 2-1 valve functions to maintain the second speed brake engaged for a time after application of the first speed brake is begun, giving a predetermined overlap of brake engagement and preventing a temporary engine runaway without full load.

As has just been described, the conduit 369 is exhausted for low speed drive, and the modulated throttle pressure existing in the conduit 394 and thus in the conduit 404 flows across the ball 397 and into the conduit 403 through the ports 402 and 401 and into the port 380 of the servo regulator valve 135. The conduit 369, when exhausted, removes the pressure as modulated by the servo regulator valve 135 from the right end of the land 389 of this valve, and modulated throttle pressure is instead applied through the port 380 to the land 387 of the piston 370 augmenting the action of the spring 390 in tending to move the piston 370 to the right. Thus, modulated throttle pressure applied to the land 387 tending to move the piston 370 to the right has been substituted for the servo-regulated pressure applied to the land 389 tending to move the pistons 370 and 371 to the left. This change of pressure tends to move the piston 370 farther to the right and to open the port 382 with respect to the port 376, so that the servo regulated pressure in the conduit 336 is greater for low speed drive than it is for second speed drive. The pressure supplied from the conduit 336 through the restriction 393 and port 378 tending to move the pistons 370 and 371 to the left is for the purpose of regulating the pressure in the conduit 336 so that it reaches a predetermined higher maximum for low speed drive than for second speed drive. Since the pressure in the conduit 336 has a higher predetermined maximum for low speed drive than for second speed drive, the pressure builds up much faster on the brake piston 113 when the 1–2 valve piston 311 moves into its low speed position than on the piston 98 for applying the second speed brake 33 when the 1–2 valve piston 311 is in its second speed position, thereby providing a smooth completion of the power trains. It will be understood that the action of the servo regulator valve 135 differs for various positions of the accelerator and various power outputs of the vehicle engine, since it has the modulated throttle pressure from the conduit 394 impressed on it giving higher pressures in the servo regulated conduit 336 for greater throttle openings, to assure that the ratio changes remain smooth and the brakes 33 and 34 have sufficient engaging pressure with greater engine throttle openings.

The transmission may be upshifted from first to second speed ratio by releasing the accelerator sufficiently to close the valve 234 to thereby decrease the throttle pressure through the port 339 impressed on the downshift valve piston 337, so that the piston 337 moves back to its illustrated position. Line pressure again will be applied through the conduits 352 and 353 to the land 331 of the 1–2 shift valve piston 311 tending to move the piston back again to the right into its second speed position. The 1–2 valve 136 is also under the control of throttle pressure and governor pressure, the governor pressure being applied through the governor output conduit 276 and port 325 on the land 326 tending to move the pistons 310, 311 and 312 to the right and the throttle pressure being applied through the conduits 251 and 304 and the port 318 on to the land 332 tending to move the pistons 310, 311 and 312 in the opposite direction. While driving in low speed ratio with the accelerator depressed and vehicle speed increasing, the governor pressure on the land 326 and the line pressure on the land 331 will eventually overcome the effect of the throttle pressure and will move the pistons 310, 311 and 312 to the right into their second speed drive positions, so that the transmission will be upshifted from low speed drive to second speed drive.

The 2–3 valve 137 is for the purpose of upshifting the transmission from second speed drive to third speed drive. The 2–3 valve 137 also has throttle pressure applied on one end and governor pressure applied on the other end, the throttle pressure being applied through the conduits 251 and 304 and the port 287 to the right end of the piston 280, and the governor pressure being applied through the conduits 276 and 309 and the port 292 to the left end of the piston 278. As the speed of the vehicle increases, the governor pressure eventually increases such that it is strong enough to overcome the effect of the throttle pressure, and the governor pressure moves the pistons 278, 279 and 280 to the right against the action of the springs 300 and 302. In this connection, the functioning of the plug 280 should be noted—it provides a regulated pressure through the port 289 and applied to the right face of the land 297 augmenting the actions of the springs 300 and 302 in holding the piston 279 against movement to the right into its upshifted position. The plug 280 regulates similar to the other regulating valves in the transmission controls, such as the load valve 133, metering fluid flow between the right edge of the land 299 and an edge of the port 288 into the port 289, and the regulated pressure is effective to augment the action of the spring 302 in moving the piston 280 to the right to close the port 288 and stop the metering effect of the piston 280.

When the piston 279 is in its upshifted position, it connects the ports 290 and 284 by means of the groove between the lands 295 and 296, so that line pressure is supplied from the port 204 of the manual valve 132, through the conduit 306, the restriction 305, the ports 290 and 284 and the conduit 86 to the piston 79 for the clutch 32. The clutch 32 is thus engaged to complete the high speed forward drive. The conduit 86 is also connected with the cavity 101 on one side of the piston 98 for the brake 33, and the application of fluid pressure into the cavity 101 augments the action of the spring 99 and overcomes the effect of pressure in the cavity 102 and causes disengagement of the brake 33 to break the second speed power train.

The transmission may also be downshifted from third speed drive to second speed drive by moving the accelerator to its open throttle kickdown position in which it opens the valve 234. Such opening of the valve 234, as has been previously explained, causes the downshift valve piston 337 to move to the right, and the piston 337 in this position connects the port 344 supplied with line pressure from the conduit 150 with the port 343 and the conduit 354. The conduit 354 is connected with the port 286 of the 2–3 valve 137, and line pressure is thus supplied between the plug 280 and the piston 279 to be effective on the right face of the land 297 so as to augment the action of the springs 300 and 302. The line pressure thus applied is effective to move the piston 279 back to the left into its second speed position, and the transmission is then again in second speed drive.

The transmission is set for low range operation by moving the selector valve piston 195 into its "L" position. In this position, it connects the line pressure supply port 203 with the ports 197 and 198 by means of the groove between the lands 205 and 206, and it connects the line pressure supply port 202 with the port 201 by means of the groove between the lands 206 and 207. The port 204 supplied with line pressure in the "D" position of the selector valve piston 195 is drained to the sump. The port 204, as previously described, is connected with the conduits 352 and 306. The conduit 306 was used in "D" range for supplying line pressure to the clutch 32 and to the release cavity 102 of the brake 33; and therefore, line pressure is not available at this time for direct drive. The conduit 352 is connected with the downshift valve 129 for the purpose of supplying line pressure to the 1–2 valve 136 for holding this valve for its second speed position until the downshift valve 129 moves into its downshifted position; however, since line pressure is not supplied to the conduit 352 at this time, the 1–2 valve 311 is in its downshifted position assuming that the selector valve 132 is moved in "L" position when the vehicle is stationary. The port 197 supplies line pressure as before to the governor 138 and also to the clutch 31 for maintaining this clutch engaged. The port 198, as in drive range of the controls, supplies line pressure to the servo regulator valve 135 for eventual supply of regulated fluid to the servo motors for the brakes 33 and 34.

The line pressure supplied to the port 201 from the port 202 of the selector valve 132 flows through the conduit 308 to the ports 291, 314 and 319 of the 2-3 valve 137 and the 1-2 valve 136. The line pressure supplied to the port 291 of the 2-3 valve 137 is applied on to the land 278, assuming that the speed of the vehicle is sufficiently low that the 2-3 valve is in its second speed position, and under these conditions, the line pressure flowing through the port 291 latches or holds the pistons 278 and 279 in their second speed positions. Regardless of whether or not, however, the speed of the vehicle is this low, the transmission, when the selector valve piston 195 is moved into its "L" position, assuming that the vehicle has previously been traveling with the selector valve 132 in its "D" position, will be downshifted at least into its second speed ratio, since the line pressure through the conduit 306 and connected port 290 is drained by movement of the selector valve piston 195 into its "L" position.

The line pressure in conduit 308 from the selector valve port 201 is supplied to the port 319 of the 1-2 valve 136, and this pressure tends to move the 1-2 valve 136 back into its first speed position. Assuming that the speed of the vehicle is rather low, this application of line pressure on the right end of the piston 312 will cause this movement of the 1-2 valve 136, and the transmission will shift from second speed ratio to low speed ratio. The line pressure from the conduit 308 is also supplied through the port 314 of the 1-2 valve 136, and once the 1-2 valve 136 has moved into its low speed position, line pressure from the port 314 applied to the land 326 will hold or latch the 1-2 valve 136 in its low speed position. The transmission therefore cannot shift from low speed ratio to either of the higher speed ratios once the 1-2 valve 136 has moved into its low speed position. The line pressure applied through the conduit 308 and port 319 to the right end of the valve piston 312 of the 1-2 valve 136 functions to assure that the downshift into low speed drive occurs approximately at the same speed of the vehicle as does the downshift into low speed ratio from intermediate speed drive with the engine throttle being open but short of the kickdown position and with the selector valve 132 being in its "D" position. The 2-1 valve 134 functions in conjunction with the servo regulator valve 135 to control the timing between the application of the band brake 34 and the release of the brake 33 in the same manner as when a downshift from intermediate speed drive to low speed drive occurs when the valve 132 is in its drive position.

Reverse drive through the transmission is completed by moving the selector valve piston 195 from its "N" to its "R" position. In this position, the line pressure supply port 203 is connected with the port 198, and the line pressure supply port 202 is connected with the ports 201 and 200. The port 198 supplies fluid, as for drives previously described, through the conduit 395 to the servo regulator valve 135 for thereby supplying servo-regulated brake engaging fluid pressure; the port 201 supplies fluid through the conduit 308 to the ports 291, 314 and 319 of the 2-3 valve 137 and the 1-2 valve 136 for maintaining these valves in their downshifted positions; and the part 200 supplies line pressure to the conduits 303 and 392.

The line pressure in the conduit 303 flows through the port 283, the groove between the lands 295 and 296 of the 2-3 valve 137, the port 284 and the conduit 86 to the piston 79 for engaging the clutch 32. The fluid in the conduit 86 is also supplied to the release cavity 101 of the servo motor for the brake 33, and this brake is maintained disengaged.

The servo regulator valve 135 meters fluid flow between edges of its port 382 and its land 385, as has been previously described, supplying a regulated pressure to the conduit 336. This regulated pressure is supplied to the port 324 of the 1-2 valve 136, through the groove between the lands 328 and 329, the port 316 and the conduit 335 to the servo motor for the brake 34, and the brake 34 is thus engaged to complete the reverse drive power train through the transmission.

When the reverse drive power train is thus completed, servo regulated pressure in the conduit 336 is supplied to the port 378 of the servo regulator valve 135, and modulated throttle pressure from the conduit 394 is supplied to the ports 381 and 380 in the same manner as for low speed drive. The line pressure present in the conduits 303 and 392 is supplied to the port 374 of the servo regulator valve 135 and is, however, effective for changing the regulating action of the valve 135 for reverse drive as compared to low speed drive. The line pressure supplied to the port 374 is applied on the land 384 and tends to move the piston 370 to the right to a greater extent than for low speed forward drive. This tendency of movement causes the modulated throttle pressure in the conduit 394 and supplied to the ports 381 and 380 to open the port 382 by means of the land 385 sooner than for low speed forward drive, so that the servo regulated pressure in the conduit 336 builds up sooner with respect to opening of the engine throttle. There is thus a greater engaging pressure for the brake 34 for reverse drive than for low speed forward drive for the same throttle opening, and such increased pressure of engagement is required due to the fact that the reaction on the brake drum 105 for the brake 34 is greater for reverse drive than for low speed forward drive.

My improved transmission controls advantageously permit an instantaneous downshift from intermediate speed drive to low speed drive when the vehicle is being started. A single servo regulator valve 135 is utilized for providing the different brake pressures required for all three drives, namely, reverse, low and intermediate. The 2-1 valve 134 advantageously times the engagement of the low speed brake with respect to the intermediate speed brake, so that a smooth change of speed ratio is obtained. The 1-2 valve 136 and the 2-3 valve 137 are so connected with the selector valve 132 that the former two valves are latched in their downshifted positions for a drive in low range once these valves shift into their downshifted positions, regardless of increases in vehicle speed. The downshift valve 129 in connection with the valve 234 under accelerator control provides a downshift in connection with both the 2-3 valve 137 and the 1-2 valve 136, respectively, from high to intermediate or from intermediate to low speed ratios.

I wish it to be understood that the invention is not to be limited to the specific constructions and arrangements shown and described, except only insofar as the claims may be so limited, as it will be apparent to those skilled in the art that changes may be made without departing from the principles of the invention.

I claim:

1. In transmission mechanism for an automotive vehicle having a driving engine with a throttle, the combination of an accelerator for controlling the engine throttle, a drive shaft, a driven shaft, means for providing a relatively high speed ratio power train between said shafts, means for providing a relatively low speed ratio power train between said shafts, means for rendering the high speed power train effective between said shafts as the accelerator is moved from its closed throttle position toward open throttle position for starting the vehicle from rest, means for downshifting the transmission mechanism from its high speed ratio to its low speed ratio for increasing the vehicle acceleration when said accelerator is moved to an open throttle kickdown position and including a leader valve actuated when the accelerator reaches its said kickdown position and causing actuation thereby of a follower valve into its downshifted position, a hydraulic governor driven by said driven shaft and providing an increasing governor pressure as the speed of the driven shaft increases, and a third valve hydraulically connected with said governor and movable by the increasing governor pressure so as to thereby upshift the transmission mechanism from its said low speed ratio to its said high speed ratio as the speed of said driven shaft increases with said accelerator remaining in its said open throttle kickdown position.

2. In transmission mechanism for an automotive vehicle having an engine with a throttle, the combination of an accelerator for controlling the engine throttle, a drive shaft, a driven shaft, means for providing a low speed power train and an intermediate speed power train and a high speed power train between said shafts, means for rendering the intermediate speed power train effective between said shafts as the accelerator is moved from its closed throttle position toward open throttle position for starting the vehicle from rest, a hydraulic governor driven by said driven shaft and providing a governor output pressure that increases with shaft speed, means for subsequently upshifting the transmission mechanism from its intermediate speed power train to its high speed power train and including a shift valve subject to the governor output pressure and movable thereby, means for alternatively downshifting the transmission mechanism from its intermediate speed power train to its low speed power train for increasing the vehicle acceleration when the accelerator is moved to an open throttle kickdown position, said last-named means including a second shift valve movable under accelerator control from an intermediate speed position to a low speed position and being also under the control of said governor output pressure so as to be returned to its said intermediate speed position as the speed of said driven shaft increases.

3. In transmission mechanism for an automotive vehicle having an engine with a throttle, the combination of an accelerator for controlling the engine throttle, a drive shaft, a driven shaft, means for providing a plurality of different ratio power trains between said shafts, a shift valve for changing the transmission mechanism from one of its power trains to another of its power trains, a hydraulic governor driven by said driven shaft providing a governor pressure that increases with shaft speed and effective on said shift valve tending to shift it to an upshifted position, means associated with the vehicle accelerator for providing a throttle pressure that increases up to a predetermined maximum as the accelerator approaches an open throttle kickdown position and effective on said shift valve tending to oppose the action of said governor, a second shift valve for changing the drive through the transmission mechanism and subject to said throttle pressure which is ineffective to move the latter valve as it increases to its said predetermined maximum, and valve means under the control of said accelerator for increasing said throttle pressure above said predetermined maximum when the accelerator is moved to an open throttle kickdown position so as to cause actuation of said second shift valve for shifting the transmission mechanism at the kickdown position of the accelerator.

4. In transmission mechanism for an automotive vehicle having a throttle controlled engine with a fuel intake manifold the vacuum in which varies with the engine throttle opening, the combination of an accelerator for controlling the engine throttle, a drive shaft, a driven shaft, means for providing a plurality of different ratio power trains between said shafts, regulating valve means connected with said engine manifold for providing a throttle pressure that increases with the engine throttle opening up to a predetermined maximum, a shift valve for shifting the transmission mechanism between ratios and subject to said throttle pressure which is ineffective to move the latter valve as it increases to its said predetermined maximum, and valve means under the control of said accelerator for connecting said first-named regulating valve means with atmosphere instead of with said manifold when the accelerator is moved to an open throttle kickdown position for increasing the throttle pressure above said predetermined maximum for thereby actuating said shift valve to cause a change of drive through the transmission mechanism.

5. In transmission mechanism for an automotive vehicle having a throttle controlled engine with a fuel intake manifold the pressure in which varies with throttle opening, the combination of an accelerator for controlling the engine throttle, a drive shaft, a driven shaft, means for providing a plurality of different ratio power trains between said shafts, a shift valve for changing the drive through the transmission mechanism, a hydraulic governor driven by said driven shaft and providing a governor pressure increasing with driven shaft speed and effective on said shift valve, regulating valve means under the control of a vacuum motor connected with said manifold for providing a throttle pressure that increases with throttle opening and applied to said shift valve opposing the action of said governor pressure, a second shift valve for changing the drive through the transmission mechanism and subject to said throttle pressure, said throttle pressure varying up to a predetermined maximum value as said accelerator approaches an open throttle kickdown position and said predetermined value of pressure being ineffective to move said second valve, and a valve under the control of said accelerator and connecting said vacuum motor with atmosphere for thereby increasing said throttle pressure above its said predetermined maximum for thereby actuating said second shift valve for changing the drive through the transmission mechanism when the accelerator reaches its said open throttle kickdown position.

6. In transmission mechanism for an automotive vehicle having an engine with a throttle, the combination of an accelerator for controlling the engine throttle, a drive shaft, a driven shaft, means for providing a low speed power train and an intermediate speed power train and a high speed power train between said shafts, means for shifting from said low to said intermediate speed power train and including a shift valve having a downshifted and an upshifted position, means for shifting from said intermediate to said high speed power train and including a second shift valve having a downshifted and an upshifted position, a hydraulic governor driven by said driven shaft and providing a governor pressure that increases with driven shaft speed, means associated with said accelerator for providing a throttle pressure that increases with accelerator opening, said governor pressure and said throttle pressure being applied to both of said shift valves so that the governor pressure tends to shift the valves from their downshifted to their upshifted positions and the throttle pressure tends to oppose such valve movement, and means including a manually operated selector valve for applying a fluid pressure to both of said shift valves simultaneously holding them in their downshifted positions so that said governor pressure cannot be effective to move the shift valves from their downshifted to their upshifted positions.

7. In transmission mechanism for an automotive vehicle having an engine with a throttle, the combination of an accelerator for controlling the engine throttle, a drive shaft, a driven shaft, means for providing a low speed power train and an intermediate speed power train and a high speed power train between said shafts, means for shifting the transmission mechanism from its low speed power train into its intermediate speed power train, means for shifting the transmission mechanism from its intermediate speed power train to its high speed power train, each of said two last-named means including a shift valve having a downshifted and an upshifted position, a hydraulic governor driven by said driven shaft and providing a governor pressure that increases with driven shaft speed, means associated with said accelerator for providing a throttle pressure that increases with engine throttle opening, said governor pressure and said throttle pressure being applied to both of said shift valves with said governor pressure tending to upshift the shift valves and the throttle pressure tending to oppose such valve movement, a source of fluid pressure, and a manually operated selector valve for selectively applying fluid pressure from said source on to both of said shift valves preventing an upshifting movement of both of the shift valves once they have been moved into their downshifted positions and for applying a pressure on the shift valve for the change from the low speed power train to the intermediate speed power train augmenting the action of the throttle pressure to decrease the governor speed at which the shift valve moves into its downshifted position from its upshifted position with decreasing vehicle speed.

8. In transmission mechanism, the combination of a drive shaft, a driven shaft, means for providing a low speed forward drive between said shafts and including a fluid pressure operated friction brake for completing the drive, means for providing a relatively high speed forward drive between said shafts and including a second fluid pressure operated friction brake for completing this drive, a source of fluid pressure, a regulator valve for regulating pressure from said source as applied to said friction brakes and having two different lands, means for applying the pressure as regulated by said regulator valve and applied to said higher speed friction brake to both of said lands for the high speed drive, and means for applying the pressure from said source to one of said lands and bleeding the other said lands for the low speed drive so as to provide a higher pressure for application to said low speed brake as compared to said high speed brake.

9. In transmission mechanism for an automotive vehicle having an engine with a throttle, the combination of an accelerator for controlling the engine throttle, a drive shaft, a driven shaft, means for providing a relatively low speed power train and a reverse drive between said shafts and including a fluid pressure engaged friction brake for completing both the forward and reverse drives and requiring a greater pressure of application for the reverse drive as compared to the forward drive, means for providing a higher speed forward drive between said shafts and including a fluid pressure operated second friction brake for completing the drive and requiring a smaller fluid pressure than is required for the first-named brake for either the reverse or low speed forward drives, a source of fluid pressure, means for regulating the pressure of said source in accordance with the opening of the engine throttle so as to increase the pressure of the source as the engine throttle is opened, a regulator valve for further regulating the pressure from said source as applied to said brakes and including first, second and third lands, said lands being so disposed that pressure applied to said first land tends to reduce the pressure output of said regulator valve and pressure applied to said second and third lands tends to increase the pressure output of said regulator valve, means for applying the pressure as regulated by said regulator valve to said first and second lands for the high speed forward drive for thereby providing a relatively low fluid pressure for engaging said second-named brake, means for applying the pressure of said source as varied by said accelerator to said second land and bleeding said first land to thereby increase the pressure output of said regulator valve as applied to said first-named brake for the low speed forward drive, and means for applying the pressure of said source as varied by said accelerator to said second land and for applying another fluid pressure to said third land and bleeding said first land when the reverse drive power train is completed by engaging said first-named brake for thereby still further increasing the fluid pressure output of said regulator valve as applied to said first-named brake.

References Cited in the file of this patent

UNITED STATES PATENTS

| | | |
|---|---|---|
| 2,679,768 | Baule | June 1, 1954 |
| 2,693,711 | Kelbel et al. | Nov. 9, 1954 |
| 2,738,689 | Dodge | Mar. 20, 1956 |
| 2,766,639 | Rosenberger | Oct. 16, 1956 |
| 2,785,581 | Roche | Mar. 19, 1957 |
| 2,757,552 | English | Aug. 7, 1957 |

OTHER REFERENCES

Lincoln and Mercury Automatic Transmission Manual, Ford Motor Company, November 1954, pp. 13–24.